(12) United States Patent
Smith

(10) Patent No.: US 8,902,044 B2
(45) Date of Patent: Dec. 2, 2014

(54) BIOMETRIC CONTROL SYSTEM AND METHOD FOR MACHINERY

(75) Inventor: Gaylan S. Smith, Goddard, KS (US)

(73) Assignee: Gaylon Smith, Goddard, KS (US)

( * ) Notice: Subject to any disclaimer, the term of this patent is extended or adjusted under 35 U.S.C. 154(b) by 1074 days.

(21) Appl. No.: 12/633,309

(22) Filed: Dec. 8, 2009

(65) Prior Publication Data
US 2010/0085153 A1   Apr. 8, 2010

Related U.S. Application Data

(63) Continuation-in-part of application No. 12/554,724, filed on Sep. 4, 2009, now abandoned.

(60) Provisional application No. 61/094,428, filed on Sep. 5, 2008.

(51) Int. Cl.
| | |
|---|---|
| G05B 19/00 | (2006.01) |
| G05B 23/00 | (2006.01) |
| G06F 7/00 | (2006.01) |
| G06F 7/04 | (2006.01) |
| G08B 29/00 | (2006.01) |
| G08C 19/00 | (2006.01) |
| H04B 1/00 | (2006.01) |
| H04B 3/00 | (2006.01) |
| H04Q 1/00 | (2006.01) |
| H04Q 9/00 | (2006.01) |
| G06F 21/32 | (2013.01) |

(52) U.S. Cl.
CPC ..................................... *G06F 21/32* (2013.01)
USPC ........ 340/5.82; 340/5.52; 340/5.83; 382/115; 382/124; 200/334; 713/186; 726/2

(58) Field of Classification Search
USPC ......... 340/5.8, 5.83, 5.81, 539.13, 5.52, 5.82; 713/186; 200/334; 382/115, 124; 726/2
See application file for complete search history.

(56) References Cited

U.S. PATENT DOCUMENTS

| 4,210,899 A | 7/1980 | Swonger |
| 4,768,021 A | 8/1988 | Ferraro |

(Continued)

FOREIGN PATENT DOCUMENTS

EP    1239404 A2 *  9/2002  ............... G06K 9/00

*Primary Examiner* — Benjamin C Lee
*Assistant Examiner* — Quang D Pham

(57) ABSTRACT

The present invention is a system and method that allows only authorized users to turn on specific equipment they are approved to use and maintains a record of the name of the user, date, time and length of operating time. In one embodiment, the system comprises an AMS unit in communication with a BCS unit located at and connected to the machine. AMS comprises a computing device, a biometric reader connected with the computing device, a storage device connected with the computing device, a program module stored on the storage unit, and a communication module connected to the computing device. The program module has sets of code configured to instruct the biometric reader to scan the biometric feature of the operator and to create a digitized biometric signature. The program module is further configured to store the biometric signature on the storage device. The BCS unit comprises a computing device, a biometric reader connected with the computing device, a storage device connected to the computing device, a program module stored within the storage device, and a communication module connected with the computing device and in communication with the communication module of the AMS. The biometric reader of the AMS unit is adapted to detect the presence of the biometric feature of the operator and to scan and create a digitized biometric signature. The program module of the BCS unit is configured allow the user to turn-on the machine if the user's biometric signature matches the authorized biometric signature.

6 Claims, 7 Drawing Sheets

(56) References Cited

U.S. PATENT DOCUMENTS

| | | |
|---|---|---|
| 5,579,909 A | 12/1996 | Deal |
| 5,701,770 A | 12/1997 | Cook |
| 5,719,950 A | 2/1998 | Osten |
| 5,878,399 A | 3/1999 | Peralto |
| 5,903,225 A | 5/1999 | Schmitt |
| 6,163,737 A | 12/2000 | Fedor |
| 6,182,221 B1 | 1/2001 | Hsu |
| 6,256,616 B1 | 7/2001 | Brookner |
| 6,256,737 B1 * | 7/2001 | Bianco et al. ............... 713/186 |
| 6,373,148 B1 | 4/2002 | Daiss |
| 6,381,502 B1 | 4/2002 | Rudder |
| 6,487,662 B1 | 11/2002 | Kharon |
| 6,496,595 B1 * | 12/2002 | Puchek et al. ............... 382/124 |
| 6,498,861 B1 * | 12/2002 | Hamid et al. ............... 382/124 |
| 6,510,350 B1 | 1/2003 | Steen |
| 6,581,161 B1 | 6/2003 | Byford |
| 6,837,422 B1 | 1/2005 | Meder |
| 6,927,671 B2 * | 8/2005 | DeBono ............... 340/5.83 |
| 6,980,672 B2 | 12/2005 | Saito |
| 7,000,827 B2 | 2/2006 | Meder |
| 7,006,893 B2 | 2/2006 | Hart |
| 7,043,060 B2 | 5/2006 | Quintana |
| 7,068,145 B2 * | 6/2006 | Reitmeier ............... 340/5.53 |
| 7,075,195 B2 * | 7/2006 | Feil ............... 307/142 |
| 7,099,236 B2 | 8/2006 | Yamagishi |
| 7,131,614 B2 | 11/2006 | Kisak |
| 7,155,034 B1 * | 12/2006 | Recce ............... 382/115 |
| 7,184,848 B2 | 2/2007 | Krzyzanowski |
| 7,298,275 B2 | 11/2007 | Brandt |
| 7,353,142 B2 | 4/2008 | Azpitarte |
| 7,389,916 B2 | 6/2008 | Chirnomas |
| 7,404,086 B2 * | 7/2008 | Sands et al. ............... 713/186 |
| 7,420,546 B2 | 9/2008 | Abdallah |
| 7,424,618 B2 | 9/2008 | Roy |
| 7,620,605 B2 * | 11/2009 | Hoffman et al. ............... 705/52 |
| 2001/0016696 A1 * | 8/2001 | Bystrom et al. ............... 601/41 |
| 2001/0025342 A1 * | 9/2001 | Uchida ............... 713/186 |
| 2002/0030582 A1 * | 3/2002 | Depp et al. ............... 340/5.53 |
| 2002/0095587 A1 * | 7/2002 | Doyle et al. ............... 713/186 |
| 2002/0095608 A1 * | 7/2002 | Slevin ............... 713/202 |
| 2004/0025029 A1 * | 2/2004 | Yu ............... 713/186 |
| 2004/0190756 A1 * | 9/2004 | Kim et al. ............... 382/115 |
| 2005/0015596 A1 * | 1/2005 | Bowers ............... 713/170 |
| 2006/0080550 A1 * | 4/2006 | Awatsu et al. ............... 713/186 |
| 2006/0132283 A1 | 6/2006 | Eberhart |
| 2006/0176146 A1 * | 8/2006 | Krishan et al. ............... 340/5.53 |
| 2006/0262480 A1 * | 11/2006 | Stewart ............... 361/251 |
| 2006/0294359 A1 * | 12/2006 | Chou et al. ............... 713/2 |
| 2007/0038351 A1 | 2/2007 | Larschan |
| 2007/0055888 A1 * | 3/2007 | Miller et al. ............... 713/186 |
| 2007/0058843 A1 | 3/2007 | Theis |
| 2007/0076923 A1 * | 4/2007 | Chiu ............... 382/124 |
| 2007/0171027 A1 * | 7/2007 | Slevin ............... 340/5.52 |
| 2007/0199047 A1 * | 8/2007 | Gibart et al. ............... 726/2 |
| 2007/0292006 A1 * | 12/2007 | Johnson ............... 382/124 |
| 2008/0148395 A1 * | 6/2008 | Brock ............... 726/21 |
| 2008/0190749 A1 * | 8/2008 | Poyner et al. ............... 200/334 |
| 2008/0260211 A1 * | 10/2008 | Bennett et al. ............... 382/115 |
| 2008/0319507 A1 * | 12/2008 | Myers ............... 607/50 |
| 2009/0226052 A1 | 9/2009 | Fedele et al. ............... 382/125 |
| 2009/0309701 A1 * | 12/2009 | Peled ............... 340/5.83 |
| 2010/0013597 A1 * | 1/2010 | Determan et al. ............... 340/5.82 |

* cited by examiner

BIOMETRIC CONTROL SYSTEM AND METHOD FOR MACHINERY

CROSS-REFERENCE TO RELATED APPLICATIONS

This application is a continuation-in-part of application Ser. No. 12/554,724 filed on Sep. 4, 2009, now pending, that claims the benefit of and priority to Provisional Application Ser. No. 61/094,428 filed on Sep. 5, 2008, both of which are hereby incorporated by reference in their entirety into this specification.

BACKGROUND OF THE INVENTION

Safety is a major concern with machinery used in the manufacturing industry. Employees using equipment they are not properly trained in the use of exposes the employee to potential peril, as well as exposing the company to potential lawsuits, higher accident and workers compensation rates.

BRIEF DESCRIPTION OF THE DRAWINGS

The following description of the invention will be fully understood with reference to the accompanying drawings in which.

SUMMARY OF THE INVENTION

The present invention is a system and method that allows only authorized operators to turn on specific equipment they are approved to use. The system and method maintains a record of the operator's identification, date, time, and length of operating time. In one embodiment, the system comprises an access management system (AMS) in communication with one or more machines each equipped with a biometric control switch (BCS) unit. The AMS comprises a computing device, a biometric reader connected with the computing device, a storage device connected with the computing device, a program module stored on the storage unit, and a communication module connected to the computing device. The program module has sets of code configured to instruct the biometric reader to scan the biometric feature of the operator and to create a digitized biometric signature. The program module is further configured to store the biometric signature on the storage device. The BCS unit comprises a computing device, a biometric reader connected with the computing device, a storage device connected to the computing device, a program module stored on the storage device, and a communication module connected with the computing device and capable of communication with the communication module of the AMS. The biometric reader of the BCS unit is adapted to detect the presence of the biometric feature of the operator and to scan and create a digitized biometric signature. The program module of the BCS unit is configured to allow the operator to turn-on the machine if the biometric signature matches the authorized biometric signature.

DESCRIPTION OF THE INVENTION

Figure 1:
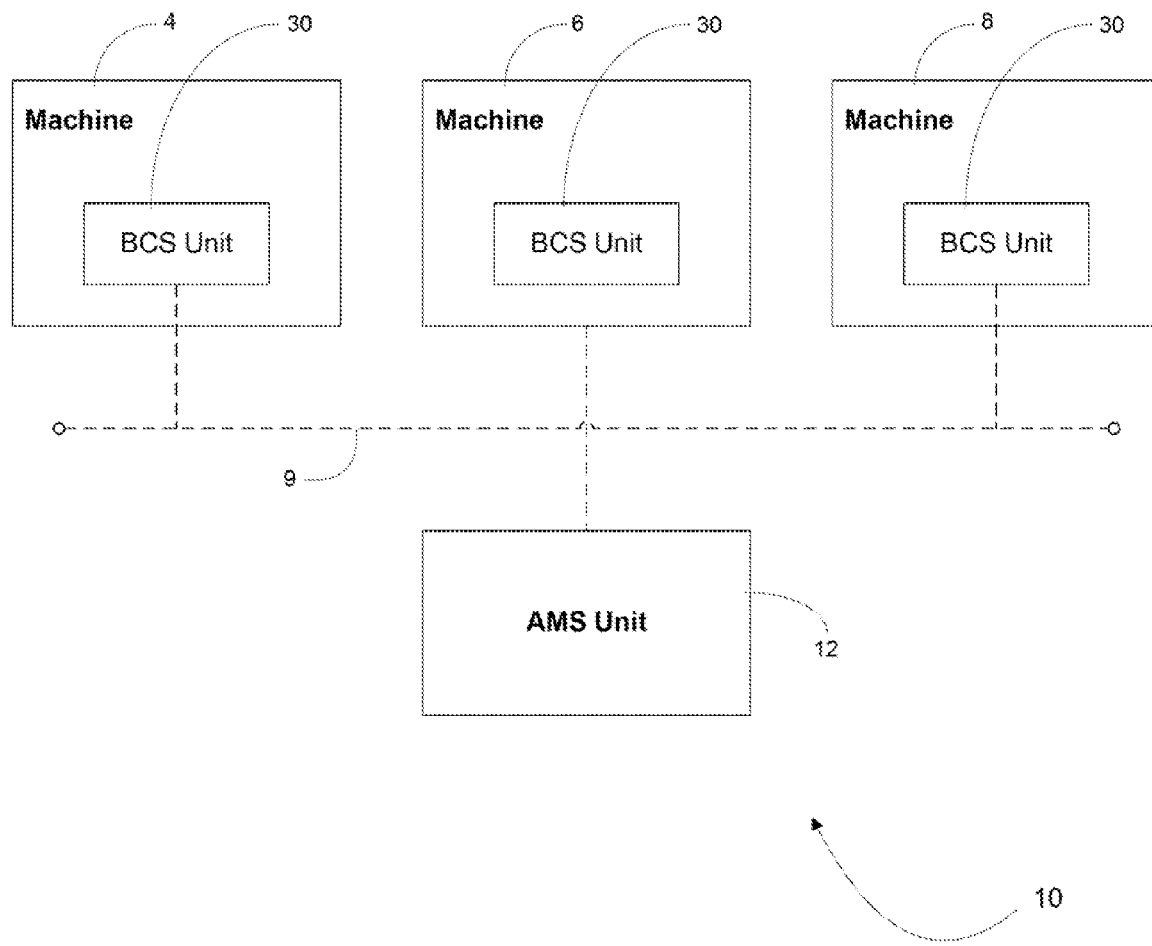
FIG. 1 is a high level block diagram of a biometric control system according to the present invention showing an AMS in communication with a plurality BCS units.

Referring to FIG. 1, the present invention is a system 10 that allows only authorized users to turn on specific equipment they are approved to use. System 10 maintains a record of the name of the user, date, time, and length of operating time. System 10 may store other information relating to the user and machines 4, 6, and/or 8. System 10 generally comprises a central access management system (AMS) 12 and one or more machines 4, 6, and 8 each equipped with a biometric control switch (BCS) unit 30. AMS 12 is a special purpose computer system having a program module 21 (to be described) running thereon. Similarly, BCS unit 30 is a special purpose computer system having a program module 36 (to be described) running thereon. Machines 4, 6, and 8 may be any type of commercial and/or industrial machine such as manufacturing equipment used in a factory having a defined work area or construction equipment used on a construction site covering a large or undefined area. AMS 12 and BCS units 30 communicate with each other over a conventional communication network 9 such as a wireless network or a hard wired network. The type of communication network 9 employed by system 10 depends upon the distance between AMS 12 and BCS units 30. In applications where AMS 12 and BCS units 30 are in relatively close proximity such as a factory, the preferred communication network 9 is a wireless network and more specifically a WIFI® wireless local area network (LAN) employing a router (not shown). In applications where BCS units 30 are a significant distance from AMS unit 12, cellular and internet networks would be the preferred type of communication network 9. BCS unit 30 may be fabricated as part of machines 4, 6, and/or 8 by an original equipment manufacturer (OEM). In another embodiment, BCS unit 30 may be retro-fitted to existing machines 4, 6, and/or 8.

Figure 2:
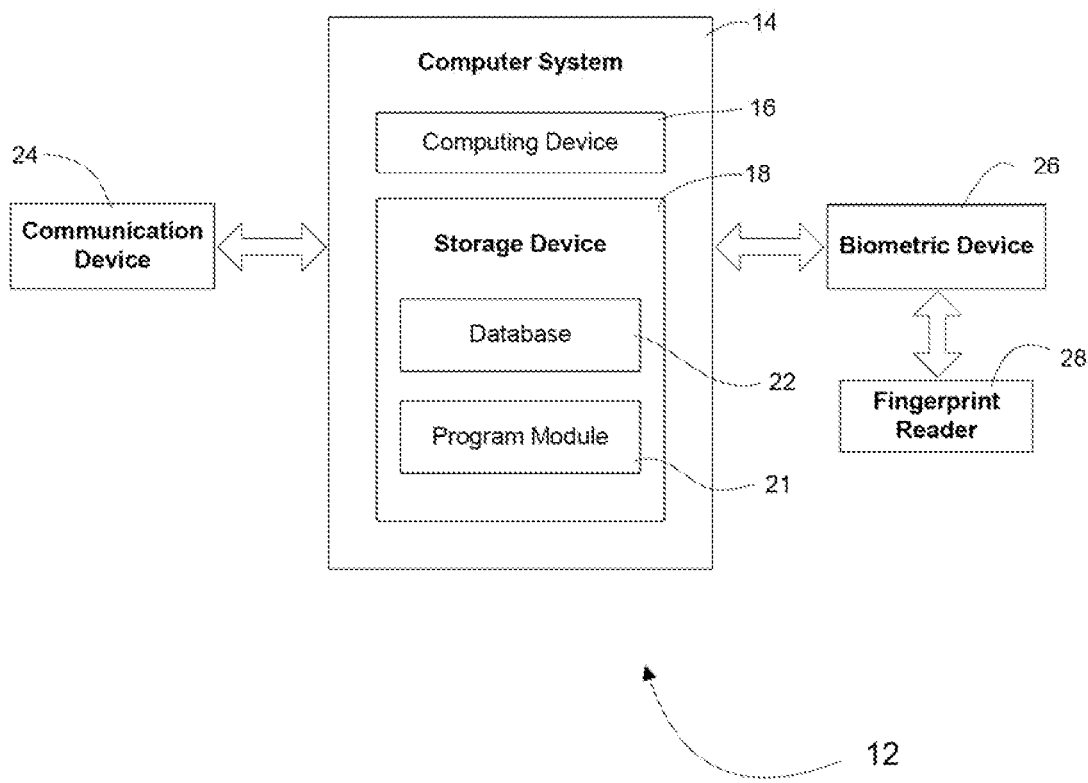
FIG. 2 is a high level block diagram showing the architecture of the AMS according to the present invention.

Referring to FIG. 2, AMS 12 comprises a computer system 14 having a computing device 16 and a storage device 18. In the embodiment shown, computing device 16 is a microprocessor that is commonly available. In the embodiment shown, storage device 18 is a hard disk drive that is commonly available. AMS 12 further comprises a database 22 configured and stored on storage device 18. Database 22 may store various information or records relating to machines 4, 6, and 8 which can be updated and retrieved. This information may include, but is not limited to, the name of the authorized user or operator, date, time, and length of operating time. AMS 12 further comprises a program module 21 stored on storage device 18. As will be described more fully herein, program module 18 comprises computer code or software used to configure and/or operate AMS unit 12 by providing instructions to computing device 16. AMS 12 further comprises a communication device 24 for communication with BCS units 30 of machines 4, 6, and 8. In a wireless WIFI® network application, communication device would be a WIFI® internal or external adapter card. In a cellular application, communication device would use data packets. AMS 12 further comprises a biometric device 26 adapted to store a unique biometric feature of an authorized employee or user of machines 4, 6, and/or 8. In the embodiment shown, biometric device 26 is a fingerprint reader. Using biometric device 26, the user's fingerprint is sensed, read, registered, encrypted, and digitally stored in database 22. Although not shown, a system administrator has access to AMS 12 to specify, for example, which machines the authorized user has access to and over what time periods. In other embodiments, biometric device 26 may employ an iris recognition reader or system adapted to sense, read, register, encrypt, and digitally store an authorized user's iris in database 22. In other embodiments, the user or operator of machines 4, 6, and 8 might be a robot rather than a person. In this situation, biometric device 26 would be tailored to read, register, encrypt, and digitally store in database 22 a feature that is unique to the robot.

Figure 3:
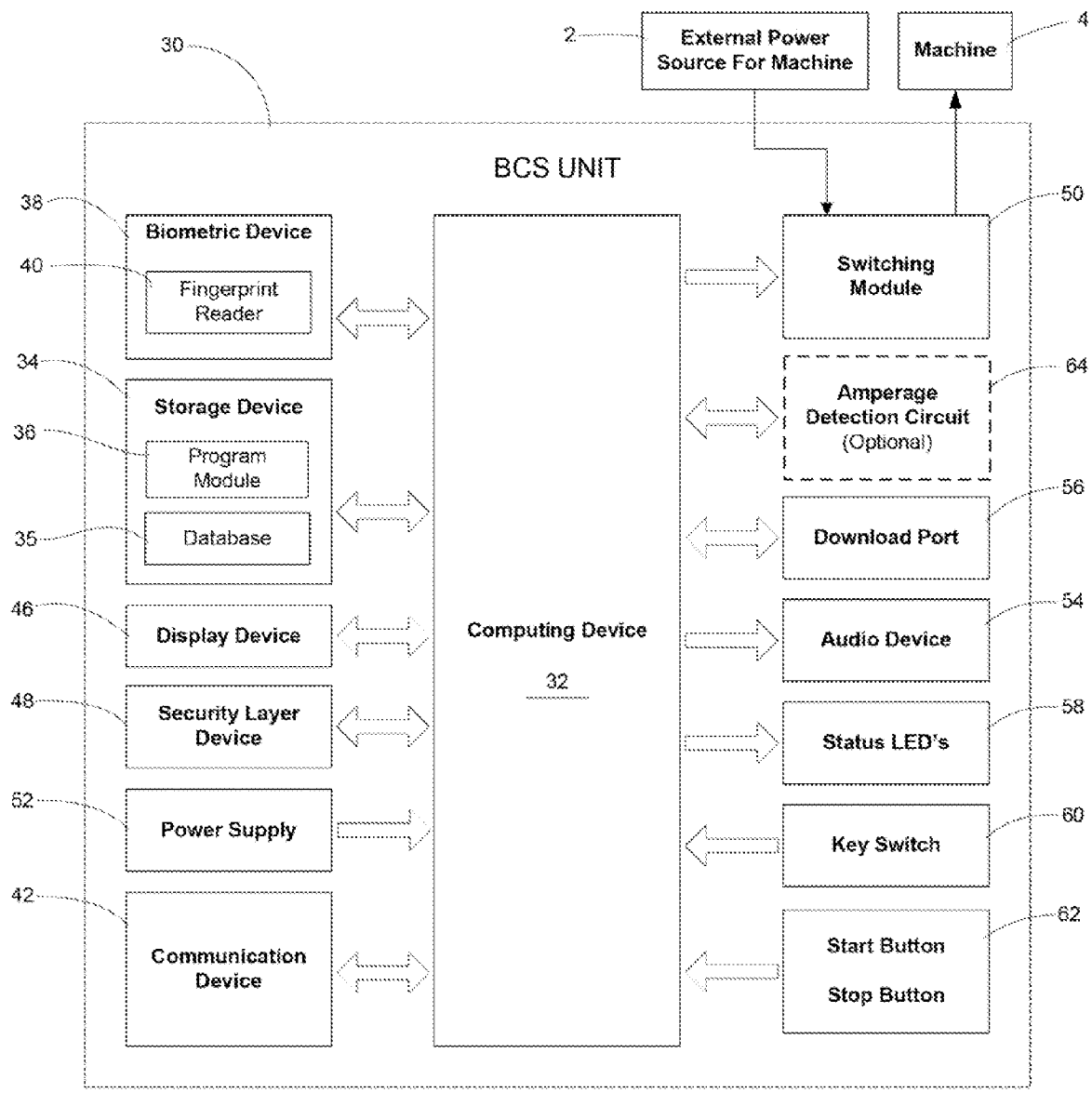
FIG. 3 is a high level block diagram showing the architecture of the BCS unit in an OEM embodiment of the present invention.

Referring to FIG. 3, each BCS unit 30 generally comprises a computing device 32 and a storage device 34. Each BCS unit 30 further comprises a database 35 configured and stored on storage device 34. Database 35 may contain or store various information or records relating to the machine employing BCS unit 30 which can be updated during the course of the day and transmitted to AMS 12 over network 9. This information may include, but is not limited to, the name of the authorized user or operator, date, time, and length of operating time. Each BCS unit 30 further comprises a program module 36 stored on storage device 34. As will be described more fully herein, program module 36 comprises computer code or software used to configure and/or operate BCS unit 30 by instructing computing device 32. In the embodiment shown, computing device 32 is a micro-controller that is widely available and storage device 34 is an EEPROM fabricated as part the micro-controller and programmed by well known means. In other embodiment, computing device 32 may be a microprocessor and storage device 34 may be a hard disk drive.

Each BCS unit 30 further comprises a biometric device 38 connected to computing device 32. Biometric device 38 is adapted to sense and read a specific biometric feature of the user or operator. In the case of humans, the biometric feature may be a fingerprint or an eye. In the case where a user or operator is robot, the biometric feature may be some feature or code that is unique to the robot. In the embodiment shown, biometric device 38 has a fingerprint reader 40. Fingerprint reader 40 reads and encrypts the user's fingerprint that is stored on fingerprint reader 40. As will be described more fully herein, program module 36 instructs computing device 32 to check the user's fingerprint against authorized fingerprints stored on database 35 and will either signal the operator that he/she is authorized causing a signal to be sent to switching module 50 (to be described) turning on the machine or notify the user that she is rejected. In the embodiment shown, message notifications are conveyed to the user either by displaying a message using a display device 46, status LEDs 58, or generating an audible signal using an audio device 54. Display device 46 may be take the form a variety of conventional display devices (2×16 LCS; 64×128 LCD; or 240×32 LCD) having select buttons or touch screen capability. Similarly, audio device 54 is commonly available.

Each BCS unit 30 further comprises a communication device 42 for communicating with AMS 12 over communication network 9 (FIG. 1). In a wireless WIFI® network application, communication device 42 would take the form of a WIFI® internal or external adapter card. In a cellular application, communication device 42 may take the form of a quad band cellular module.

Each BCS unit 30 further comprises a security layer device 48 adapted to provide an additional layer of security to biometric device 38. In the embodiment shown, security layer device 48 may employ a radio frequency identification (RFID) reader that requires the user to present an object such as a tag or card for scanning by the reader to gain access to the machine. Security layer device 48 may also be a keyboard requiring the user to enter a password.

Each BCS unit 30 further comprises a start/stop button 62 connected to computing device 32. Start/stop button 62 is adapted to allow the user to start or stop the machine after the user has been identified as an authorized user of the machine. The user is authorized if his/her fingerprint matches one of the authorized fingerprints stored in database 35.

Each BCS unit 30 further comprises a switching module 50 connected to computing device 32. Switching module 50 is also connected between an external power source 2 and machines 4, 6 or 8. Switching module 50 is adapted to receive a signal from computing device 32 indicative of either "turn on" or "turn off" of machine 4, 6, or 8. Computing device 32 receives the "turn on" or "turn off" signal from activation of start/stop button 62 by the user. If switching module 50 receives a "turn on" signal from computing device 32 then external power source 2 is connected with the machine thereby turning it on. If switching module 50 receives a "turn off" signal from computing device 32 then external power source 2 is disconnected from the machine thereby turning it off. In the embodiment shown, switching module 50 has a power contactor or magnetic solenoid that is used to open and close an electrical connection between external power source 2 and the machine. In other applications, switching module 50 may employ a digital relay having a MOSFET diode or logic level output. The type of electro-mechanical and/or electrical circuit employed by switching module 50 will vary depending upon the type of machine.

Each BCS unit 30 further comprises a power supply 52 connected to computing device 32. Power supply 52 provides an independent power source to the various components of BCS unit 30. For applications where only an external AC power source is available, as might be typical in a factory, power supply 52 may take the form of an AC/DC converter. For applications where only a DC power source is available, as might be typical in farming equipment, power supply 52 may take the form of a DC/DC converter. In other embodiments, power supply 52 may take the form of a battery or a solar power supply. Power supply 52 is commonly available.

Each BCS unit 30 further comprises a download port 56 connected to computing device 32. Port 56 may be used by an authorized person such as an administrator to download information stored in database 35 to an external storage device (not shown) for subsequent uploading to AMS 12 or for general back-up. Download port 56 is commonly available.

Each BCS unit 30 further comprises a LED module 58 connected to computing device 32. LED module 58 provides the user with a visual color display of the status of a given function or operation of the machine such as "on"; "off"; "authorized"; or "unauthorized." LED module 58 is activated by a signal from computing device 32. LED module 58 is widely available.

Each BCS unit 30 further comprises a key switch 60 connected to computing device 32. Key switch 60 allows the person to over ride biometric device 38 and/or security layer device 48 to gain access to the machine. In the embodiment shown, key switch 60 is adapted to receive a master mechanical key (not shown). When the master key (not shown) is inserted into key switch 60 and turned one way (for example clockwise) the person may power the machine by-passing biometric device 38 and security layer device 48. Additionally, if BCS unit 30 is used as a stand-alone unit (i.e., without any AMS 12) then the key (not shown) may be turned counter-clockwise causing fingerprint reader 40 to read, encrypt, and store a master fingerprint of the person on database 35. Thereafter, the person having the master fingerprint may use the fingerprint reader 40 to gain access to BCS unit 30 and software stored on program module 36 may cause a menu to appear on display device 46 allowing the person to add additional authorized users by having their fingerprints read and encrypted by the fingerprint reader 40 and stored on database 35.

Figure 4:
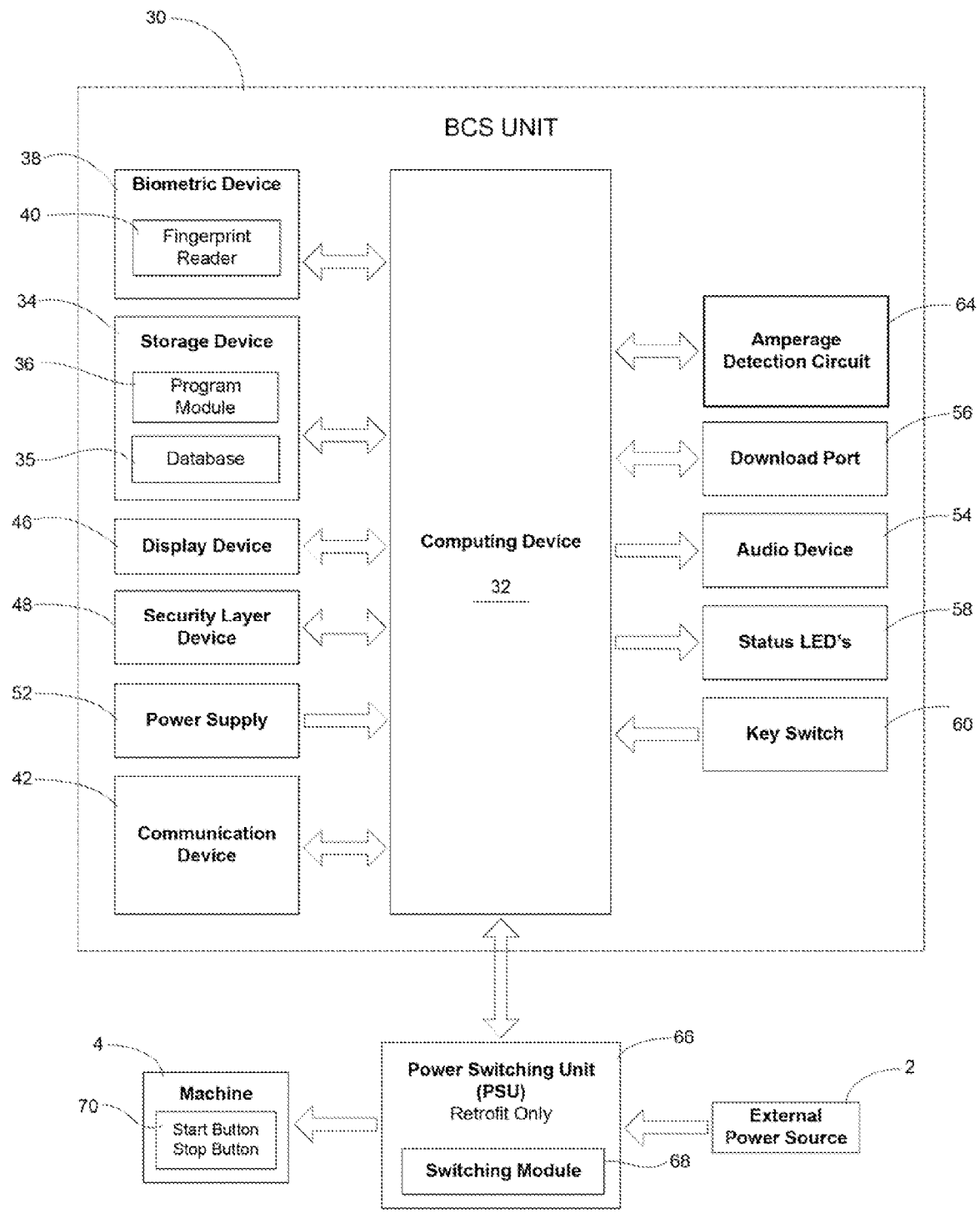
FIG. 4 is a high level block diagram showing the architecture of the BCS unit in a retro-fit embodiment of the present invention.

Referring to FIG. 4, BCS unit 30 may configured as a retro-fit or add on to an existing machine rather than built as part of the machine by the OEM as depicted in FIG. 3. In the retrofit embodiment of the invention, BCS unit 30 comprises all of the same components as the OEM embodiment of FIG. 3 except for an internal switching module 50 or a start/stop button 62. In the retrofit embodiment, start/stop button 62 is not employed as the user would utilize the existing start and stop buttons 70 of machine 4. In the retrofit embodiment of the invention, each BCS unit 30 further comprises an amperage detection circuit 64 connected to computing device 32 and to a power switching unit (PSU) 66 (to be described). Detection circuit 64 is constructed of conventional circuitry to sense whether or not there is current draw or flow thru a switching module 68 (to be described) of PSU 66 and to send a steady-state digital or analog signal to computing device 32 indicative of whether or not a current is flowing thru switching module 68. PSU 66 is physically separate from BCS unit 30 and is also directly connected to computing device 32. Switching module 68 operates similar to switching module 50 for an OEM machine having a BCS unit 30 (FIG. 3). PSU 66 is installed to interrupt the power flow, such as in the power cord, such that switching module 68 is located between external power source 2 and machine 4. Upon receipt of a signal from computing device 32, switching module 68 is adapted to connect or disconnect machine 4 from external power source 2. If switching module 68 is in a state where machine 4 is connected to external power source 2 then amperage detection circuit 64 will sense a current flow. If switching module 68 is in a state where machine 4 is disconnected from external power source 2 then amperage detection circuit 64 will not sense any current draw. As will be described more fully herein, if the machine switch happens to be in the "on" position, then BCS unit 30 will signal the operator to turn off the machine thereby reinitializing BCS unit 30. This reduces the possibility of an unexpected machine start up giving an extra layer of safety. If the machine switch is in the "off" position, switching module 68 is then energized allowing the power to flow to the machine for normal operation. BCS unit 30 will allow a set number of seconds to start up the machine, after which time BSC unit 30 will disconnect PSU 66. When the operator is finished running the machine, BCS unit 30 will sense there is no longer current to the machine and log the user, date, time, and amount of time the machine ran. This information is uploaded to AMS 12 when available or stored in database 35 until manually downloaded via port 56.

Figure 5:
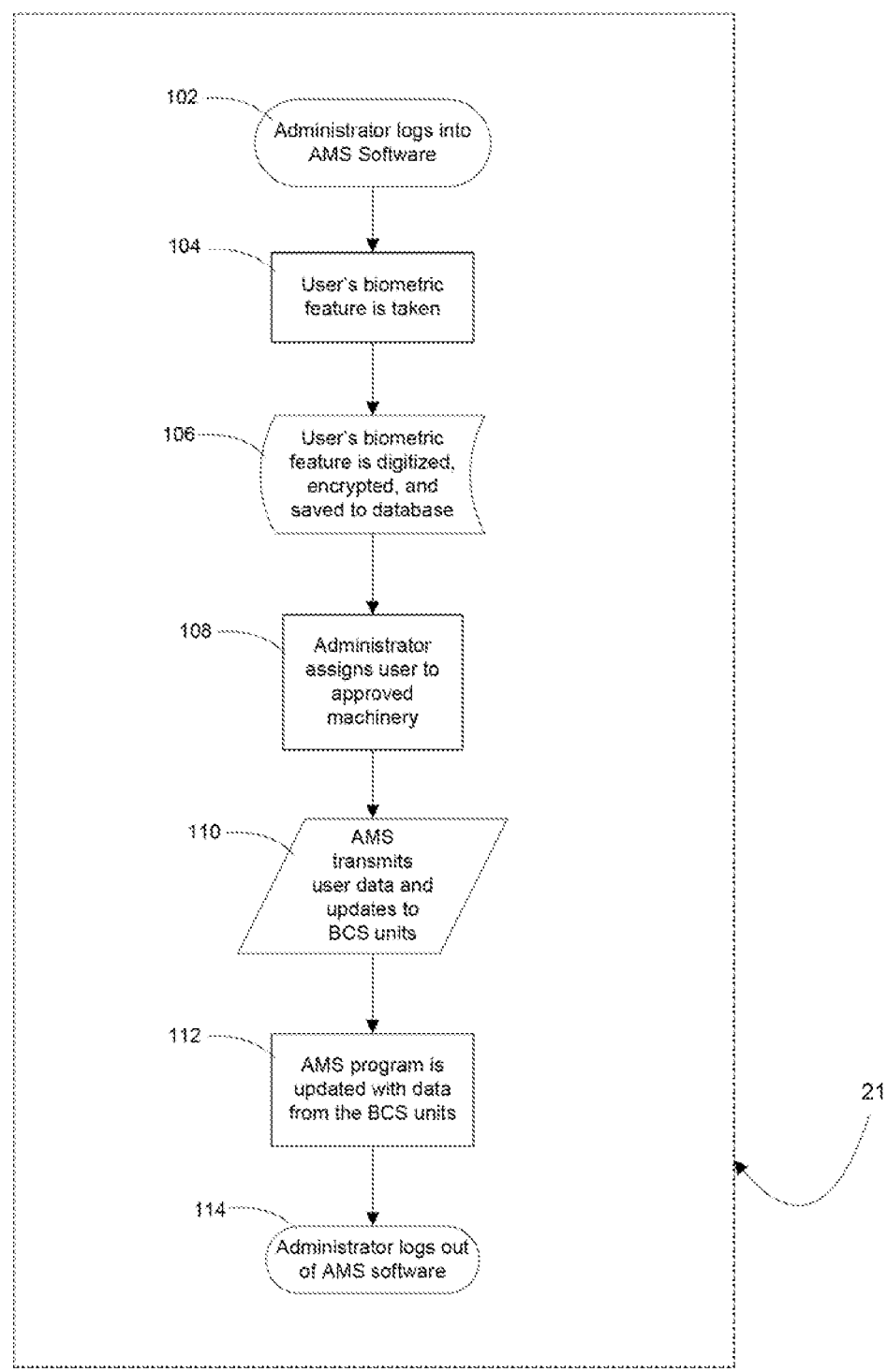
FIG. 5 is a high level flow chart showing the operation of the AMS according to the present invention.

Referring to FIG. 5, wherein a high level flow chart shows the process of program module 21 and AMS 12. As shown by block 102, an administrator logs into AMS 12. The log in procedure may be accomplished by the administrator entering a username and password and/or using a biometric feature. Control is then passed to block 104 where an employee to be designated an authorized user of one or more machines 4, 6, and 8 places his/her finger (index finger or thumb) on fingerprint reader 28 of biometric device 26 where the fingerprint is read. Control is passed to block 106 where the fingerprint is digitized and saved in database 22. Control is passed to block 108 where the administrator assigns or designates the user to one or more approved machines 4, 6, and/or 8 thereby becoming an authorized user of the assigned machine. Although not shown, software module 21 may be configured to allow the administrator to designate specific times of day, or number of times, that the user is an authorized user of one or more machines 4, 6, and/or 8. Control is passed to block 110 where software module 21 is configured to instruct computing device 16 to transmit the updated user data from database 22 to BCS units 30 of machines 4, 6, or 8. Although not shown, software module 21 may be programmed to provide transmission of updated user data each time an existing user's information is changed and/or a new user is added to database 22 or at specific times of the day or week. Control is passed to block 112, where database 22 of AMS 12 is updated with new information transmitted by one or more BCS units 30 of machines 4, 6, and/or 8. Control is passed to block 114 where the administrator logs out of AMS 12. Although not shown, once the administrator does a change, it will send and receive whether or not the administrator is logged in. Updates will be program selectable, usually once a day during non-operating hours to collect data.

Figure 6:
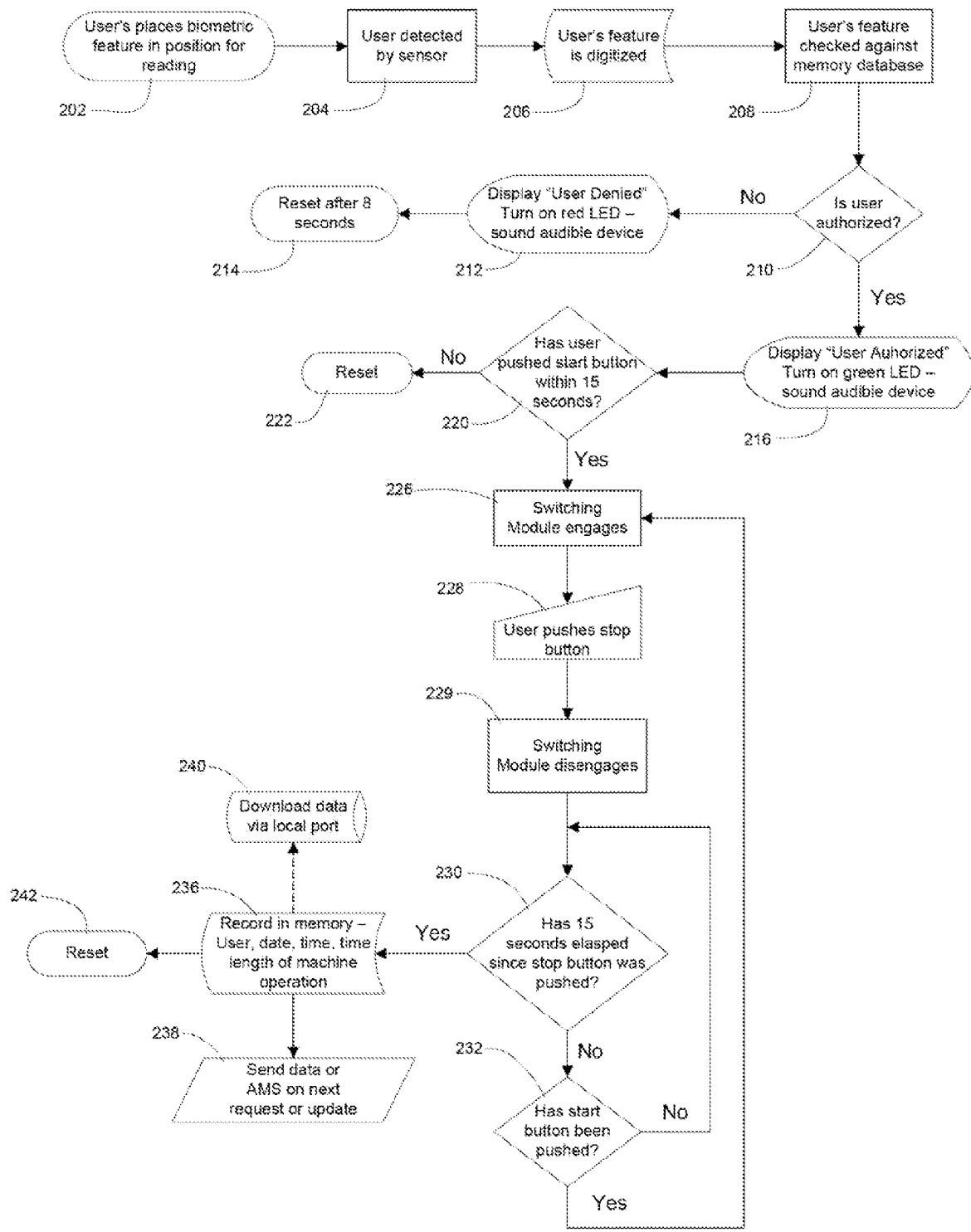
FIG. 6 is a high level flow chart showing the operation of the BCS unit in an OEM embodiment of the present invention.

Referring to FIG. 6, wherein a high level flow chart shows the method or process of program module 36 and BCS unit 30 in the OEM embodiment (FIG. 3). Although applicable to any machine having BCS unit 30, for ease of description, this process will be described with reference to machine 4. As shown by block 202, a prospective user of a machine such an employee places a finger (typically, an index finger or thumb) on finger print reader 40 associated with machine 4. Control is passed to block 204 where a sensor (not shown) of fingerprint reader 40 detects that a finger has been placed on the reader for reading. Control is passed to block 206 where the user's fingerprint is digitized. Control is passed to block 208 where program module 36 instructs computing device 32 to compare the digitized fingerprint against authorized digitized fingerprints stored in database 35 of BCS unit 30. Control is passed to a decisional block 210 where program module 36 instructs BCS unit 30 decide whether the digitized fingerprint matches one of the authorized fingerprints stored in database 35. If the digitized fingerprint does not match one of the authorized fingerprints stored in database 35 then the user is not authorized and control is passed to block 212 where program module 36 instructs computing device 32 to activate display device 46 to display a message such as "User Denied." Alternatively, or in conjunction therewith, program module 36 may instruct computing device 32 to activate LED module 58 to illuminate a red LED. Alternatively, or in conjunction therewith, program module 36 may instruct computing device 32 to activate audio device 54 where a beeper is sounded. Control is passed to block 214 where program module 36 instructs computing device 32 to reset all components of BCS unit 30 after a set period of time such as eight (8) seconds. Returning to decisional block 210, if the digitized fingerprint matches one of the authorized fingerprints stored in database 35 then the user is authorized and control is passed to block 216 where display device 46 displays a message such as "User Approved" or LED Module 58 is activated to illuminate a green LED light and beeper 54 is activated. Control is passed to a decisional block 220. As indicated by block 220, BCS unit 30 determines if the user has activated start button 62 within a set period of time such as fifteen (15) seconds. This time period can be any given duration as dictated by, for example, the type of machine 4. If the user has not activated start button 62 with the fifteen (15) second time period then control is passed to block 222 where the system is reset and control is returned to block 202 wherein BCS unit 30 waits to sense the presence of an user's finger. If the user has activated start button 62 with the fifteen (15) second time period then control is passed to block 226 where a signal is sent to computing device 32 which in turn activates switching module 50 thereby connecting external power source power 2 to machine 4. Control is passed to block 228 where the user activates or pushes stop button 62 of BCS unit 30 which might occur when the user has completed a task or wishes to take a break or at the end of a complete work period on the machine. Control is passed to block 229 where activation of stop button 62 causes a signal to be sent to computing device 32 which in turn activates switching module 50 thereby disconnecting external power source power 2 from machine 4. Control is then passed to a decisional block 230 where BCS unit 30 determines if a given time period, such as fifteen (15) seconds, has elapsed since activation of stop button 62. This time period can be any given duration as dictated by, for example, the type of machine 4. If the fifteen (15) second time period has not elapsed then control is passed to block 232 where BCS unit 30 determines whether or not start button 62 has been activated. If start button 62 has been activated within the fifteen (15) second time period then control is returned to block 226 where switching module 50 is activated thereby providing power back to the machine for continued operation by the same user. Returning to block 232, if start button 62 has not been activated within the fifteen (15) second time period then control is returned to block 230 where the time period continues to be counted. As shown by decisional block 230, if the fifteen (15) seconds has elapsed since stop button 62 was activated then control is passed to block 236 where the name of the user, date, time and length of operating time is recorded in database 35 of BCS unit 30. Control is then passed to blocks 238 and 242. As shown by block 242, BCS unit 30 is reset and control is returned to block 202 where BCS unit 30 waits for another or the same user to place his/her finger on finger print reader 40. As shown by block 238, BCS unit 30 operates to send or otherwise transmit data to AMS 12 on the next network request or update. As shown by block 240, if BCS unit 30 is used as a stand-alone unit then the data may be downloaded via port 56.

Figure 7:
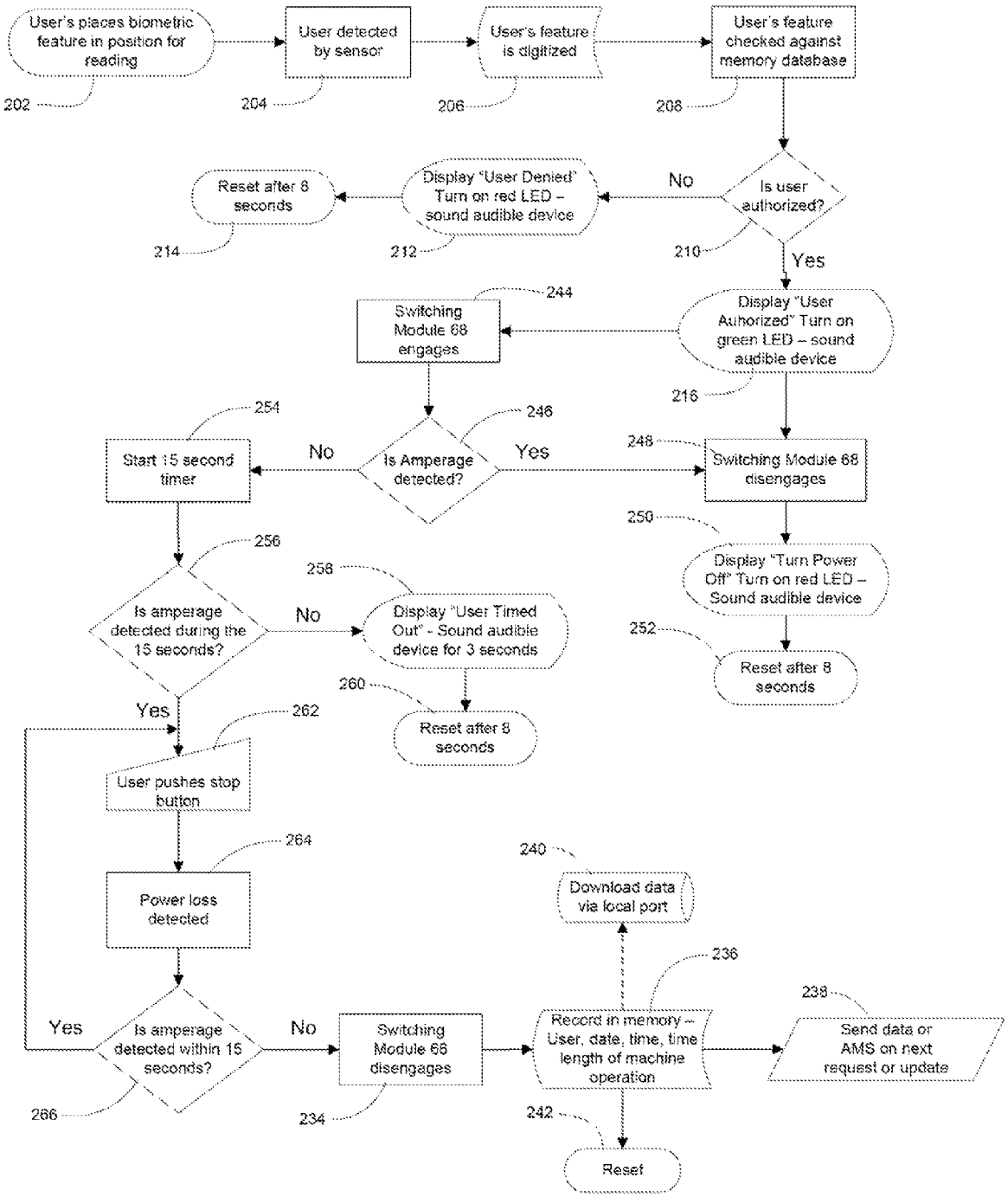
FIG. 7 is a high level flow chart showing the operation of the BCS unit in a retro-fit embodiment of the present invention

Referring to FIG. 7, wherein a high level flow chart shows the method or process of program module 36 and BCS unit 30 in the retro-fit embodiment (FIG. 4). Although applicable to any machine having BCS unit 30, for ease of description, this process will be described with reference to machine 4. The steps of blocks 202, 204, 206, 208, 210, 212, 214, and 216 are the same as the method or process of the OEM embodiment of FIG. 6. In the retro-fit embodiment, after the step of block 216, control is passed to block 244 rather than to decisional block 220 of FIG. 6. As indicated by block 244, switching module 68 of PSU 66 is activated by a signal received from computing device 32 thereby connecting external power source 2 to machine 4. Control is passed to a decisional block 246 where amperage detection circuit 64 operates to detect whether or not a current is flowing thru switching module 68. If amperage detection circuit 64 detects a current flowing thru switching module 68 then control is passed to block 248 where switching module 68 of PSU 66 is activated by a signal received from computing device 32 thereby disconnecting external power source 2 from machine 4. Control is then passed to block 250 where a message such as "Turn Power Off" is displayed on display device 46 instructing the user to turn the power off by activating stop button 70 on machine 4. Alternatively, or in conjunction therewith, a red LCD light of LED module 58 is activated and/or an audio beeper of audio device 54 is sounded for a given time period such as three (3) seconds. Control is passed to block 252 where BCS unit 30 is reset after a given period of time such as eight (8) seconds and control returns to block 202. Returning to decisional block 246, if amperage detection circuit 64 does not detect a current flowing thru switching module 68 then control is passed to block 254 where a timer generated by the microprocessor and read by the program module is set for a given period of time such as fifteen (15) seconds is started. Control is then passed to a decisional block 256 where BCS unit 30 operates to determine whether amperage detection circuit 64 detects current flow in switching module 68 within the fifteen (15) second time period. If amperage detection circuit 64 does not detect a current flow thru switching module 68 with the fifteen (15) second time period then control is passed to block 258 where a message such as "User Timed Out" is displayed by display device 46 and/or an audio beeper is sounded by audio device 54 for a given time period such as three (3) seconds. Control is passed to block 260 where the system is reset. If amperage detection circuit 64 senses a current flow thru switching module 68 with the fifteen (15) second time period (indicative that the user has activated start button 70 of machine 4) then control is passed to block 262 where BCS unit 30 waits for the user to activate stop button 70 of machine 4 which might occur when the user has completed a task or wishes to take a break or at the end of a complete work period on machine 4. Control is passed to block 264 where BCS unit 30 detects a power loss as a result of stop button 70 being activated by the user. The loss of power to machine 4 is detected by amperage detection circuit 64 sensing a loss of current flow thru switching module 68. Control is passed to a decisional block 266 where BCS unit 30 determines whether or not a current flow thru switching module 68 is detected by amperage detection circuit 64 within a given time period such as fifteen (15) seconds. This check is necessary for circumstances where the user may wish to activate stop button 70 for a short time without having to log off BCS unit 30. The specific time period is dependent upon the type of machine 4. If a current flow thru switching module 68 is detected within the specified time period then control is returned to block 262 where BCS unit 30 waits for the user to activate stop button 70 of machine 4. Returning to decisional block 266, if a current flow thru switching module 68 is not detected within the specified time period then control is passed to block 234 where switching module 68 is activated by computing device 32 thereby disconnecting machine 4 from external power source 2 (FIG. 4). Control is passed to block 236 where the name of the user, date, time and length of operating time is recorded in database 35 of BCS unit 30. Control is then passed to blocks 238 and 242. As shown by block 242, BCS unit 30 is reset returning control to block 202 where BCS unit 30 waits for another or the same user to place his/her finger on finger print reader 40. As shown by block 238, BCS unit 30 operates to send or otherwise transmit data to AMS 12 on the next network request or update. As shown by block 240, if BCS unit 30 is used as a stand-alone unit then the data may be downloaded via port 56.

The foregoing description is intended primarily for purposes of illustration. The invention may be embodied in other forms or carried out in other ways without departing from the spirit or scope of the invention.

What is claimed:

1. A system for use with an external power source and by an operator having a biometric feature, the system comprising:
 (a) an access management system (AMS) comprising
  a computing device,
  a biometric reader connected with said computing device,
  a storage device connected with said computing device, a communication module connected with said computing device; and a program module stored on said storage device; said program module comprises a first set of code operable with said computing device and said biometric reader to create and store an authorized digital signature on said storage device corresponding to the biometric feature of the operator; and (b) a first manufacturing machine comprising a biometric control switch (BCS) Unit; said BCS Unit comprises a computing device, a biometric reader connected with said computing device of said BCS Unit, a storage device connected with said computing device of said BCS Unit, and a communication module connected with said computing device of said BCS Unit and in communication with said communication module of said AMS;

said BCS Unit further comprises a switching module operable between a closed position where said first manufacturing machine is electrically connected to the external power source and an open position where said first manufacturing machine is disconnected from the external power source;

said BCS Unit further comprises a program module stored on said storage device of said BCS Unit, said program module of said BCS Unit comprises a first set of code operable with said computing device and said biometric reader of said BCS Unit to read the feature of the operator and to create and store an incoming digital signature on said storage device of said BCS unit;

a second set of code operable with said computing device of said BCS Unit to compare said incoming digital signature with said authorized digital signature received from said AMS;

a third set of code operable with said computing device of said BCS Unit to generate a first signal indicative that said incoming digital signature matches said authorized digital signature;

a fourth set of code operable with said computing device of said BCS Unit to allow the operator to turn on said first manufacturing machine in response to said first signal thereby activating said switching module to said closed position;

a fifth set of code operable with said computing device of said BCS unit to activate said switching module to said open position when said first manufacturing machine is turned off by the operator;

a sixth set of code operable with said computing device to store an operator information in response to activation of said switching module to said open position; and a seventh set of code operable with said computing device and said communication module of said BCS unit to transmit said operator information to said AMS; and said BCS Unit further comprises an on/off button to allow the operator to turn on said first manufacturing machine by switching said switching module to said closed position and to turn off said first manufacturing machine by switching said switching module to said open position in response to the operator turning on and off said first manufacturing machine by activation of the on/off button to on and off, respectively.

2. The system of claim 1, wherein said BCS Unit further comprises a status LED to display a first color in response to said first signal.

3. The system of claim 2, wherein said BCS Unit further comprises an audio device connected with said computing device of said BCS Unit; said audio device plays a first audio message in response to said first signal.

4. The system of claim 3, wherein said BCS Unit further comprises an Amperage Detection Circuit adapted to sense whether said first manufacturing machine turned on.

5. The system of claim 4, wherein said operator information comprises an operator identification, log-in time, log-off time, and operating time of the operator on said storage device of said BCS unit.

6. The system of claim 5, wherein said biometric reader of said AMS is a finger print reader and said biometric reader of said BCS Unit is a finger print reader.

* * * * *